(12) United States Patent
Matsuda

(10) Patent No.: US 11,659,130 B2
(45) Date of Patent: May 23, 2023

(54) INFORMATION PROCESSING APPARATUS HAVING MULTIPLE DISPLAY REGIONS, CONTROL METHOD, AND STORAGE MEDIUM

(71) Applicant: CANON KABUSHIKI KAISHA, Tokyo (JP)

(72) Inventor: Shoichi Matsuda, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/591,742

(22) Filed: Feb. 3, 2022

(65) Prior Publication Data
US 2022/0256055 A1    Aug. 11, 2022

(30) Foreign Application Priority Data

Feb. 9, 2021    (JP) .............................. JP2021-019318

(51) Int. Cl.
| | | |
|---|---|---|
| H04N 1/54 | (2006.01) | |
| G06K 15/12 | (2006.01) | |
| G06K 15/02 | (2006.01) | |
| H04N 1/60 | (2006.01) | |
| H04N 1/00 | (2006.01) | |

(52) U.S. Cl.
CPC ............ *H04N 1/54* (2013.01); *G06K 15/129* (2013.01); *G06K 15/1805* (2013.01); *G06K 15/1809* (2013.01); *H04N 1/0044* (2013.01); *H04N 1/00482* (2013.01); *H04N 1/6008* (2013.01); *H04N 1/6011* (2013.01)

(58) Field of Classification Search
None
See application file for complete search history.

(56) References Cited

U.S. PATENT DOCUMENTS

| | | | | |
|---|---|---|---|---|
| 6,519,050 B1 * | 2/2003 | Eintracht | ................. | H04N 1/62 358/1.9 |
| 7,420,707 B2 * | 9/2008 | Agehama | ............... | G06K 15/02 358/1.9 |
| 7,821,659 B2 * | 10/2010 | Kodama | .................. | H04N 1/54 382/167 |
| 8,077,348 B2 * | 12/2011 | Sato | ......................... | H04N 1/54 358/1.9 |
| 10,382,656 B2 * | 8/2019 | Tanase | ............... | H04N 1/40068 |

(Continued)

FOREIGN PATENT DOCUMENTS

| | | | | |
|---|---|---|---|---|
| EP | 3726826 A1 * | 10/2020 | ............ | B41J 2/2114 |
| JP | 2005-230256 A | 9/2005 | | |
| JP | 2016-103695 A | 6/2016 | | |

OTHER PUBLICATIONS

Translation of description in JP2016-103695-A (Year: 2016).*
European Search Report dated Jun. 15, 2022, in related European Patent Application No. 22154676.5.

*Primary Examiner* — Scott A Rogers
(74) *Attorney, Agent, or Firm* — Venable LLP

(57) ABSTRACT

A prescribed program causes a computer to display a first display region to execute printing by using a first color adopting an ordinary color ink being an ink of a process color and a specific color ink being an ink of a color other than the process color, and a second display region being different from the first display region to execute printing by using a second color being different from the first color and adopting at least the specific color ink.

18 Claims, 13 Drawing Sheets

(56) References Cited

U.S. PATENT DOCUMENTS

| | | |
|---|---|---|
| 10,958,809 B2* | 3/2021 | Yamashita .......... H04N 1/6027 |
| 11,297,205 B2* | 4/2022 | Tanaka .................... H04N 1/54 |
| 2020/0081669 A1 | 3/2020 | Kunimi et al. |
| 2022/0256056 A1* | 8/2022 | Takasaki .............. H04N 1/6011 |
| 2022/0256057 A1* | 8/2022 | Kawai ................. H04N 1/6008 |

* cited by examiner

| SPOT COLOR | DESIGNATED RGB | DISPLAY RGB | CORRESPONDING COMMAND (BIT FLAG) |
|---|---|---|---|
| FLUORESCENT (255,0,255) | 255,0,255 | 255,130,220 | 0b00000001 |
| FLUORESCENT (255,85,255) | 255,85,255 | 255,190,240 | 0b00000010 |
| FLUORESCENT (255,170,255) | 255,170,255 | 255,170,190 | 0b00000100 |
| FLUORESCENT (255,0,85) | 255,0,85 | 255,130,110 | 0b00001000 |
| FLUORESCENT (255,85,0) | 255,85,0 | 255,150,30 | 0b00010000 |
| FLUORESCENT (255,170,0) | 255,170,0 | 255,180,0 | 0b00100000 |

<spotcolor>00000010</spotcolor>

FIG.7B

<spotcolor>00000011</spotcolor>

FIG.7C

| SPOT COLOR | DESIGNATED RGB | DISPLAY RGB | CORRESPONDING COMMAND (BIT FLAG) |
|---|---|---|---|
| FLUORESCENT(255,255,0) | 255,255,0 | 255,230,10 | 0b00000001 |
| FLUORESCENT(255,255,85) | 255,255,85 | 255,230,100 | 0b00000010 |
| FLUORESCENT(255,255,170) | 255,255,170 | 255,230,190 | 0b00000100 |

FIG.13

INFORMATION PROCESSING APPARATUS HAVING MULTIPLE DISPLAY REGIONS, CONTROL METHOD, AND STORAGE MEDIUM

BACKGROUND OF THE INVENTION

Field of the Invention

The present invention relates to an information processing apparatus, a control method, and a storage medium for performing desired spot color printing with a printing apparatus.

Description of the Related Art

A printing apparatus aiming at expansion in color reproduction region by using an ink generally called a specific color ink of a color such as red, blue, green, and fluorescent pink in addition to basic colors of cyan, magenta, yellow, and black generally used in printing apparatuses has been developed in recent years. Moreover, a technique called spot color printing configured to express a specific location on a print product with a predetermined specific color ink has been used therein. For example, Japanese Patent Laid-Open No. 2016-103695 discloses a technique configured to perform printing while replacing information (RGB values) on a specific color with a predetermined specific color in the course of printing.

There is a demand for avoiding the occurrence of an unintended print result in the case of performing the spot color printing.

SUMMARY OF THE INVENTION

Given the circumstances, the present invention intends to provide an information processing apparatus, a control method, and a storage medium, which are capable of suppressing the occurrence of an unintended print result.

A storage medium according to the present invention is a storage medium storing a prescribed program, the prescribed program causing a computer to execute: a display controlling step of executing processing to display a first display region to execute printing by using a first color adopting an ordinary color ink being an ink of a process color and a specific color ink being an ink of a color other than the process color, and a second display region being different from the first display region to execute printing by using a second color being different from the first color and adopting at least the specific color ink; and a change controlling step of executing processing to change from setting to print a first print region in a print target image corresponding to first RGB values by using a third color being the process color to setting to print the first print region by using the first color in a case where the first display region is operated, and processing to change from setting to print a second print region in the print target image corresponding to second RGB values by using a fourth color being the process color to setting to print the second print region by using the second color in a case where the second display region is operated.

According to the present invention, it is possible to provide an information processing apparatus, a control method, and a storage medium, which are capable of suppressing the occurrence of an unintended print result.

Further features of the present invention will become apparent from the following description of exemplary embodiments with reference to the attached drawings.

BRIEF DESCRIPTION OF THE DRAWINGS

FIG. 5 is a diagram showing corresponding designated RGB values, displayed RGB values, and corresponding commands;

FIG. 7A is a diagram showing a command to be added;

FIG. 7B is a diagram showing another command to be added;

FIG. 7C is a diagram showing still another command to be added;

FIG. 13 is a diagram showing designated RGB values, displayed RGB values, and corresponding commands.

DESCRIPTION OF THE EMBODIMENTS

First Embodiment

A first embodiment of the present invention will be described below with reference to the drawings.

Figure 1:
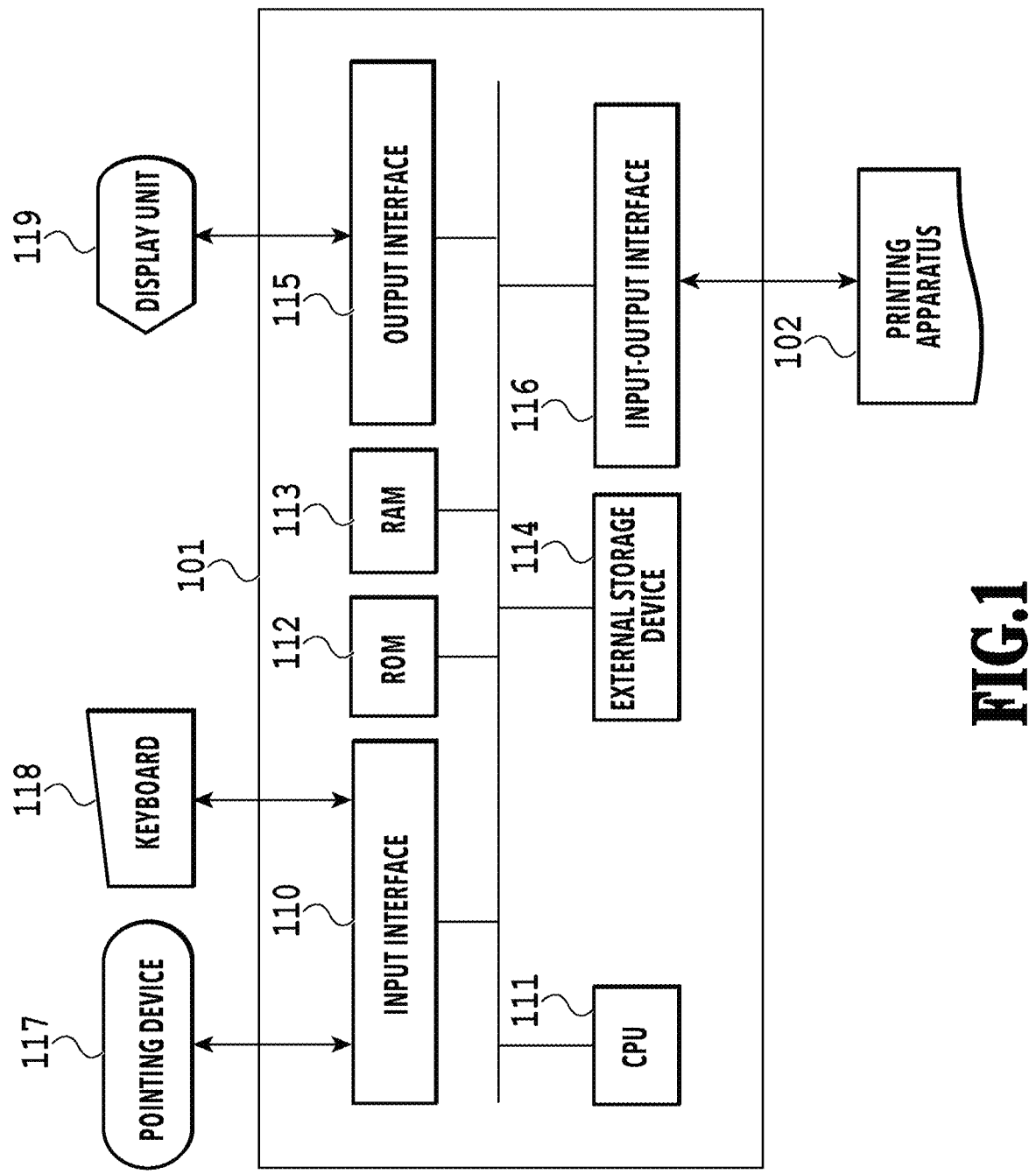
FIG. 1 is a block diagram showing a hardware configuration of a printing system.

FIG. 1 is a block diagram showing a hardware configuration of a printing system. A host computer 101 represents an example of an information processing apparatus and includes an input interface 110, a CPU 111, a ROM 112, a RAM 113, an external storage device 114, an output interface 115, and an input-output interface 116. Meanwhile, input devices including a keyboard 118, a pointing device 117, and the like are connected to the input interface 110, while a display device such as a display unit 119 is connected to the output interface 115.

An initialization program is stored in the ROM 112. A group of application programs, an operating system (OS), a printer driver, and other various data are stored in the external storage device 114. The RAM 113 is used, for example, as a work memory in executing various programs stored in the external storage device 114.

In the present embodiment, the CPU 111 implements the after-mentioned functions of the host computer 101 and processing concerning the after-mentioned flowcharts by carrying out processing in accordance with procedures of programs stored in the ROM 112. A printing apparatus (an image output apparatus) 102 is connected to the host computer 101 through the input-output interface 116. Here, the host computer 101 and the printing apparatus 102 are separately provided. However, the host computer 101 and the printing apparatus 102 may be integrated together as a single information processing apparatus. Although the description will be given below of an example in which the printing apparatus 102 is an ink jet printer which carries out printing by ejecting inks onto a sheet surface. However, the printing apparatus 102 may execute the printing in accordance with other methods (such as an electrophotographic method). Meanwhile, the CPU 111 may carry out print control of the printing apparatus 102.

In the present embodiment, the description will be given of an ink jet printer configured to carry out printing by using a color material of a special color at a specific location (hereinafter referred to as spot color printing) as an example. Moreover, the present embodiment will describe a large-format ink jet printer capable of printing on a print medium in a large size such as A0 and B0 sizes as an example of the printing apparatus. In the meantime, the host computer 101 may be any of a desktop personal computer, a smartphone, and a notebook personal computer.

Figure 2:
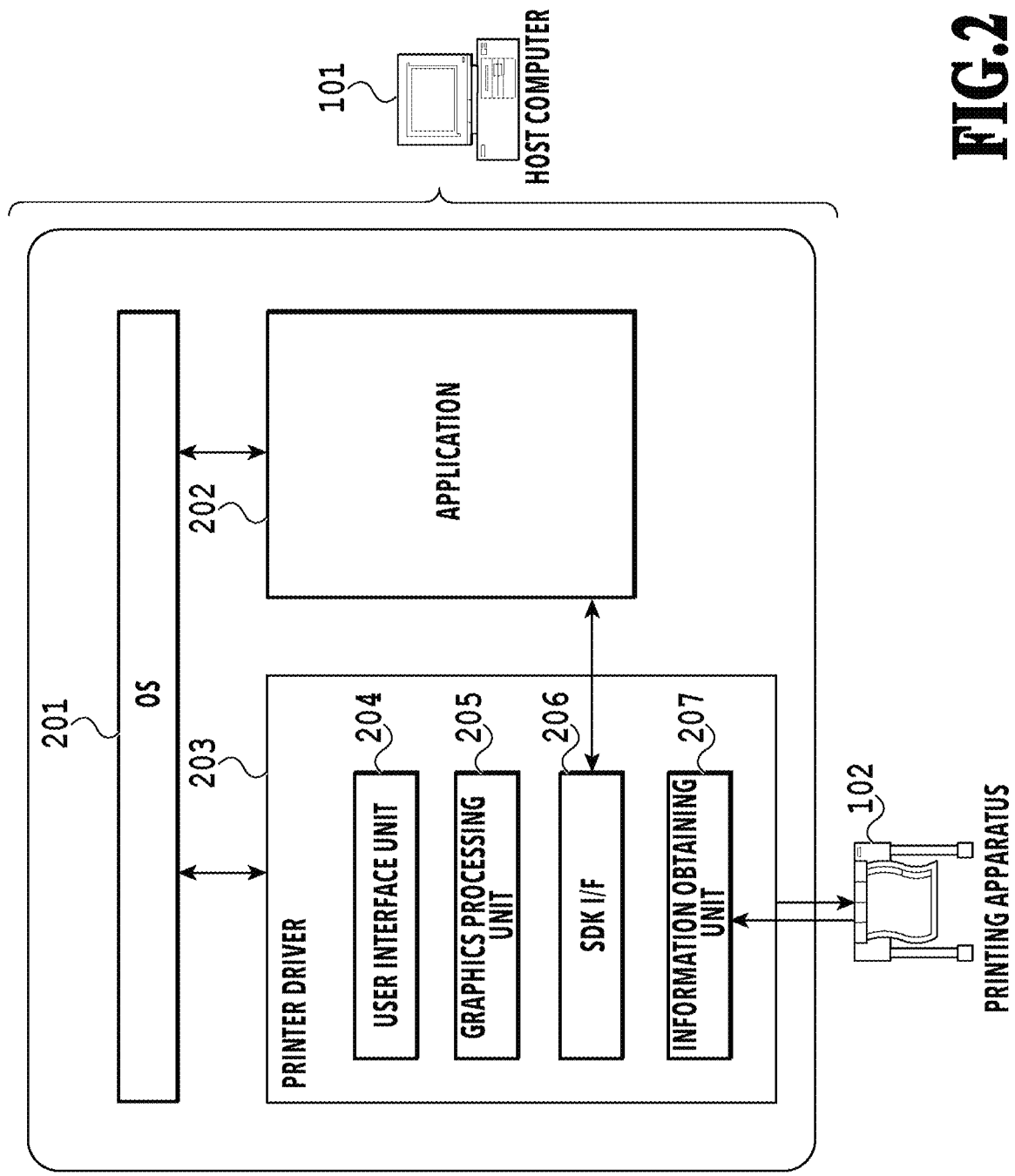
FIG. 2 is a block diagram showing a configuration of the printing system that performs spot color printing.

FIG. 2 is a block diagram showing a configuration of a printing system that performs the spot color printing. The spot color printing is a printing mode that uses an ink of a special color (a spot color ink) other than CMYK (cyan, magenta, yellow, and black) inks representing general inks. A fluorescent pink ink is used as the spot color ink in the present embodiment. However, the present invention is not limited only to this configuration and the number and colors of the special inks may be arbitrarily determined. For example, a violet ink, a green ink, or an orange ink may be used as the spot color ink. An application 202 is software for creating contents to be printed. For example, an image editing application to create poster data corresponds to the application 202. A user designates specific RGB data values on the application 202 concerning characters and graphic image data for which the user wishes to carry out the spot color printing to be described later. Upon receipt of a print request from the user, the application 202 issues a print instruction to an OS 201. Upon receipt of the print instruction, the OS 201 assigns an OS printing system (not shown) included in the OS 201 to perform processing concerning the subsequent printing. The following description will be given on the assumption that the OS printing system carries out actions in cooperation with a printer driver 203 provided by a printing apparatus vendor.

Upon receipt of a request for displaying a print setting screen from the application 202, the OS printing system requests the printer driver 203 (a color information creation unit) to display a print setting screen, and the printer driver 203 displays the print setting screen on a user interface unit 204. Although the print setting screen will be described later, a paper size, a paper type, and the like can be designated on the print setting screen and the spot color printing can also be designated thereon.

The printer driver 203 provides a software development kit (SDK) I/F 206. The use of the SDK I/F 206 enables execution of the print setting on the application 202 without opening the print setting screen of the printer driver 203. Moreover, the printer driver 203 can obtain information on the printing apparatus 102 by using an information obtaining unit 207. Based on the information obtained from the printing apparatus 102, the printer driver 203 can display setting in conformity to the functions of the printing apparatus 102 on the user interface unit 204 and support the setting by way of the SDK I/F 206.

In response to the print instruction from the application 202, the print data and the print setting in the application 202 are transferred to a graphics processing unit 205 of the printer driver 203 through the OS printing system. The graphics processing unit 205 converts these data into a data format interpretable by the printing apparatus 102, and then transmits the converted data to the printing apparatus 102. Thereafter, the inks are ejected from a print head of the printing apparatus 102 and an image is formed on a print medium fed to the printing apparatus 102. Here, in the case of setting the spot color printing, the special color ink (hereinafter also referred to as the spot color ink) is ejected to pixels having designated RGB values in the print data subjected to the print setting involving the special color (hereinafter also referred to as the spot color).

Here, a description will be given of an example of the printing apparatus 102, which can perform printing with predetermined six types of colors (special colors) adopting the spot colors by use of the spot color inks in a case where the spot color printing is set by using the printer driver 203. In the case where the spot color printing is set by using the printer driver 203, pixels having specific RGB values corresponding to the set spot color in the print data are printed by using the spot color ink. In the present embodiment, the specific RGB values are allocated to the predetermined six types of colors, respectively. In the present embodiment, the specific RGB values are R=255 (0xFF), G=0 (0x00), and B=255 (0xFF), for example. The pixels having the corresponding RGB values are printed in fluorescent pink, which is one of the special colors, by using the fluorescent pink ink.

Alternatively, the specific RGB values are R=255 (0xFF), G=85 (0x55), and B=0 (0x00), for example. The pixels having the corresponding RGB values are printed in orange, which is another one of the special colors, by using the fluorescent pink ink mixed with the M and Y inks. Here, if an orange ink is available as the spot color ink, for example, then the printing in orange may be carried out by using the orange ink only. In other words, the pixels having the specific RGB values corresponding to the spot color only need to be printed by using at least the spot color ink, and may be printed by using the ink mixed with or not mixed with any of the CMYK inks. Note that the pixels not having the specific RGB values corresponding to the spot color are printed by using the CMYK inks only even in the spot color printing. In the meantime, the spot color printing is executed in the case where the spot color printing is activated by a user operation. In other words, if the spot color print setting is not activated, then the pixels having the specific RGB values corresponding to the spot color are also printed by using the CMYK inks only with reference to the RGB values as usual.

Specifically, in the case where the printer driver 203 activates the print setting of the fluorescent pink spot color and the RGB values of the pixels included in the transmitted print data are R=255, G=0, and B=255, the printing apparatus 102 can perform the spot color printing of florescent pink. The same applies to other spot colors. Specifically, in the case where the printer driver 203 activates the print setting of each spot color and the RGB values of the pixels included in the transmitted print data have the RGB values corresponding to each spot color, the printing apparatus 102 can perform the corresponding spot color printing. On the other hand, the spot color printing is infeasible in the case where the pixels having the above-mentioned specific RGB values corresponding to the spot color printing are not included in the print data although the printer driver 203 activates the spot color print setting. In the case where the spot color printing is infeasible, an error (a warning) is notified in the present embodiment.

In the case of performing the spot color printing, the user selects the spot color to be used by way of the print setting of the printer driver 203 to begin with. Then, the user creates a content on the application 202, and designates RGB data values corresponding to the use of the above-mentioned spot color ink to characters or graphic image data that the user would like to print by using the spot color ink.

Figure 3:
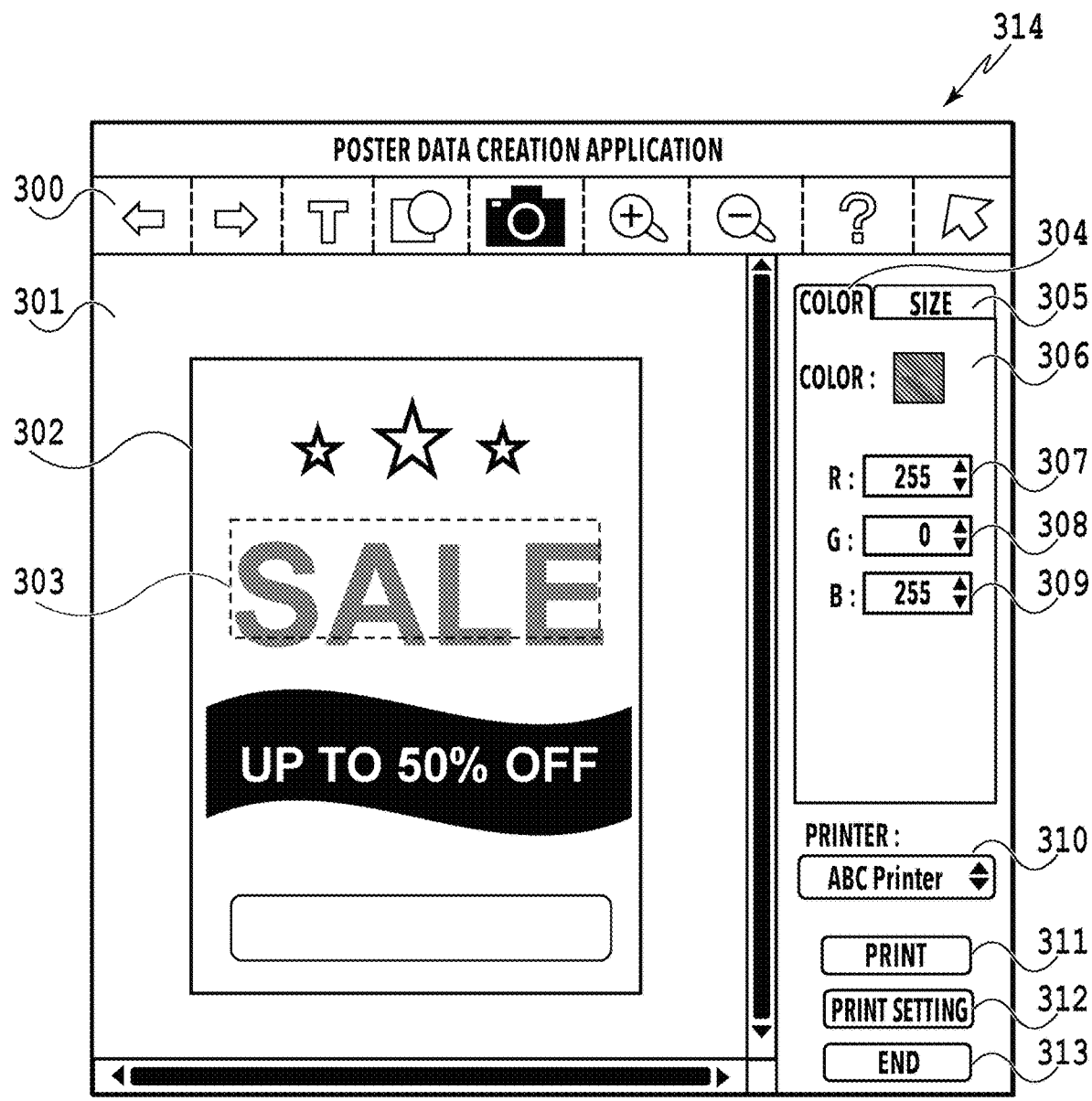
FIG. 3 is a diagram showing an example of an application.

FIG. 3 is a diagram showing an example of the application 202 of the present embodiment, which is a diagram showing a screen example of a poster data creation application 314. The poster data creation application 314 includes toolbar buttons 300, a print data display region 301, a print data editing region 302, an object selecting frame 303, an object color editing tab menu 304, and an object resizing tab menu 305. Moreover, the poster data creation application 314 includes an object display color item 306, an R value change control item 307, a G value change control item 308, and a B value change control item 309 for changing the RGB values of the object. Furthermore, the poster data creation application 314 includes a control item 310, a print button 311, a print setting button 312, and an end button 313.

The poster data creation application 314 (a print data creation unit) displays the print data in an editable manner. The toolbar buttons 300 enable selection of functions such as cancellation and redoing of an editing operation, creation of a text object, creation of a graphic object, creation of a print data object, change of a display magnification, display of help for the application, and selection of an object. The print data display region 301 is a region to display print data created by the user. The print data editing region (an image editing screen) 302 is a region that enables the user to select an arbitrary object, to move the selected object, and to edit the print data by using the pointing device 117. The object selecting frame 303 is a dashed-line display frame that shows the user that a certain object is selected in the case where the user selects the certain object.

FIG. 3 shows that selection of a text object "SALE". In the case where the object color editing tab menu 304 is selected, a control item is displayed for changing a color of the object that is currently selected. In the case where the object resizing tab menu 305 is selected, a control item is displayed for changing the size of the currently selected object.

In FIG. 3, the object color editing tab menu 304 is selected, and the object display color item 306 as well as the R value change control item 307, the G value change control item 308, and the B value change control item 309 for changing the RGB values of the object are displayed. Each control item for the R value, the G value, and the B value can set a value from 0 to 255 by directly inputting a value with the keyboard 118 or by selecting a button on the right side of each control item with the pointing device 117. Meanwhile, in the case where the RGB values are changed, the display color item 306 is also changed in accordance with the RGB values. In the example of FIG. 3, the RGB values of the text object "SALE" surrounded by the object selecting frame 303 are assumed to be set to R=255, G=0, and B=255 that represent the specific color values.

In the present embodiment, a data creation color space of the application 202 and a color space of the print data created by a rendering engine of the printer driver 203 are defined as sRGB color spaces that stand for standard RGB color spaces. Moreover, an effect of color matching processing is assumed to be negligible for the purpose of simplifying the explanation. Meanwhile, the data creation color space of the application 202 and a color space of the print data created by a rendering engine of the OS printing system are also defined as the sRGB color spaces that stand for the standard RGB color spaces. Here, the effect of the color matching processing is assumed to be negligible for the purpose of simplifying the explanation.

In other words, the RGB values expressed on the application 202 are assumed to coincide with the RGB values of the pixels included in the print data created by the rendering engine of either the printer driver 203 or the OS printing system. Accordingly, in the case of setting the RGB values R=255, G=0, and B=255 to the spot color as the print setting of the printer driver 203, the print data having the aforementioned RGB values becomes the data to be printed in the fluorescent pink spot color. The following description will be given on the assumption that the RGB values of other image objects displayed in the print data editing region 302 have the RGB values other than the aforementioned values. In the case of carrying out the color matching, the color values obtained after converting the special color before the conversion in the color space may be treated as those of the special color.

In the control item 310, a print queue for the printing apparatus 102 registered with the OS printing system in advance can be selected from a list. The print button 311 is a button to be selected by the user in the case of printing the print data displayed in the print data editing region 302 with the printer. The print setting button 312 is a button for opening a print setting detail screen. Here, a print setting screen corresponding to the print queue designated with the control item 310 is opened. The end button 313 is an end button to be selected by the user in the case of terminating the poster data creation application.

Back to the explanation of FIG. 2, upon receipt of the print request from the user, the application 202 (the poster data creation application 314) issues the print instruction to the OS 201. Upon receipt of the print instruction, the OS 201 assigns subsequent processing concerning the printing to the not-illustrated OS printing system which is provided to the OS 201. Here, the OS printing system performs operations in cooperation with the printer driver 203.

Here, it has been a general practice to set the arbitrary RGB values and to designate the spot color so as to correspond to the set RGB values, thereby printing the set RGB values in the arbitrary spot color. However, the user cannot visually check the multiple spot colors that the user can designate. For this reason, the user can hardly recognize which RGB values correspond to the spot color, and this situation may lead to the occurrence of an unintended print result.

On the other hand, the present embodiment enables the visual check of the multiple spot colors that can be designated on a spot color setting screen, so that the user can designate the spot color while visually checking the multiple spot colors. Now, a description will be given of a method of designating a spot color in the present embodiment.

Figure 4A:
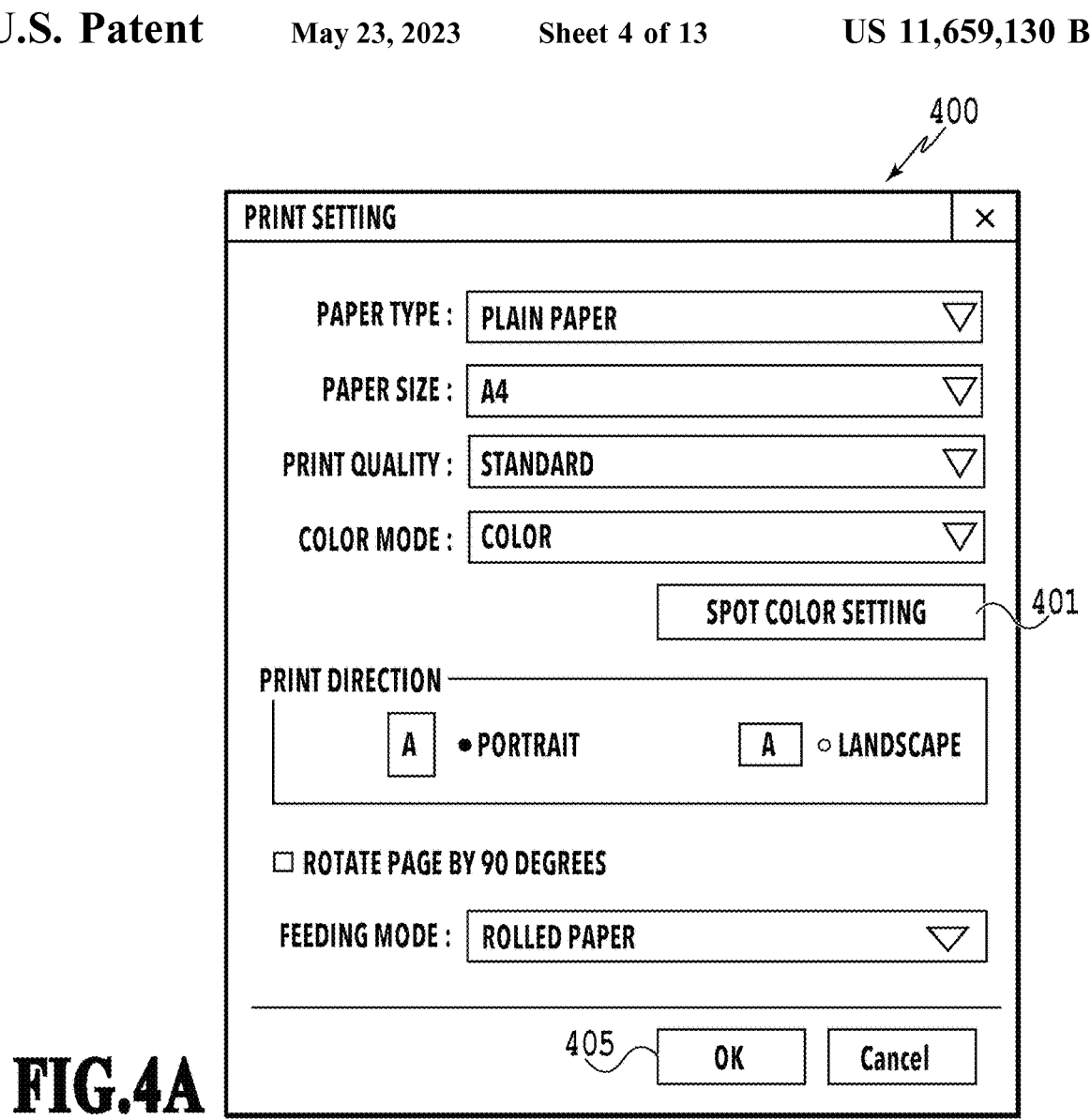
FIG. 4A is a diagram showing a print setting dialogue.
Figure 4B:
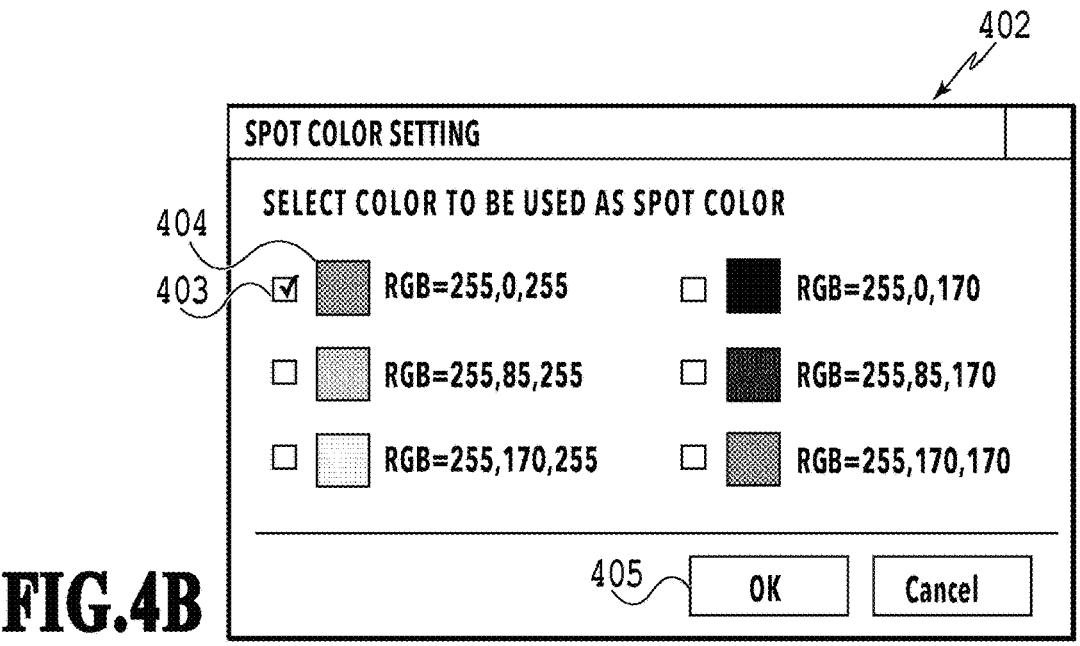
FIG. 4B is a diagram showing a spot color setting screen.

FIG. 4A is a diagram showing a print setting dialogue 400 that represents a setting screen of the printer driver 203, and FIG. 4B is a diagram showing a spot color setting screen 402 of the present embodiment. Upon receipt of an instruction to start the print setting screen from the application 202 through the OS printing system, the printer driver 203 (see FIG. 2) causes the user interface unit 204 to perform display control, thereby displaying the print setting dialogue 400. The user can obtain a desired print product from the printing apparatus 102 by performing a variety of print setting on the print setting dialogue 400. A button 401 is a button used for opening a spot color detail setting screen, and the spot color setting screen 402 in FIG. 4B is opened in the case where the button 401 is pressed.

The RGB values corresponding to the predetermined spot colors, display color items 404 based on the RGB values, and check boxes 403 used for setting whether or not to print the RGB values as the spot color are displayed on the spot color setting screen 402. In other words, each check box 403 is an item to accept selection as to whether or not it is appropriate to activate the spot color printing to print the pixels having the RGB values corresponding to the spot color in the spot color. Here, in the case where the spot color printing is not activated, the pixels having the RGB values corresponding to the spot color are printed in a color which is not the spot color. In this context, this item can also be regarded as the item for accepting a setting as to whether it is appropriate to print the pixels having the specific RGB values in the spot color or to print these pixels in a color different from the spot color. In the meantime, this item can also be regarded as the item for accepting a setting as to whether it is appropriate to print these pixels by using the spot color ink or to print these pixels by using the ordinary inks such as the CMYK inks and without using the spot color ink. Moreover, in the present embodiment, the check boxes 403 are provided for the multiple spot colors, respectively. This makes it possible to set activation and inactivation of the spot color printing depending on each of the spot colors. Accordingly, the check boxes 403 include an item to accept selection as to whether or not it is appropriate to activate the spot color printing (fluorescent pink spot color printing) to print the pixels having the RGB values corresponding to fluorescent pink in fluorescent pink, for example. Meanwhile, the check boxes 403 include an item to accept selection as to whether or not it is appropriate to activate the spot color printing (orange spot color printing) to print the pixels having the RGB values corresponding to orange in orange, for example. By employing this spot color setting screen 402, the user can select the color to be used as the spot color while visually checking the multiple spot colors that the user can designate. Moreover, since the separate check boxes are provided, it is possible to perform the setting in such a way as to activate the fluorescent pink spot color printing while inactivating the orange spot color printing, for example. FIG. 4B shows the setting in which the RGB values of R=255, G=0, and B=255 are subjected to printing as the spot color (the special color), and the check box 403 corresponding to the values R=255, G=0, and B=255 is checked and turned on.

Thereafter, in the case where the setting screen of the printer driver 203 is closed by using an OK button 405, the setting is transmitted to the application 202. Then, in the case where the printing is instructed by the application 202, the printing apparatus 102 performs the printing by using the fluorescent pink spot color ink on the condition that the corresponding RGB values (R=255, G=0, and B=255) are included in the print data created by the printer driver 203. In the case where the check box 403 is turned off on the spot color setting screen 402, the printing apparatus 102 does not use the spot color ink even if the corresponding RGB values (R=255, G=0, and B=255) are included in the print data created by the printer driver 203. In the latter case, the printing apparatus 102 forms an image at a portion having the corresponding RGB values by expressing the RGB values with process color inks such as the CMYK inks.

FIG. 5 is a diagram showing designated RGB values corresponding to the spot colors, displayed RGB values, and corresponding commands. The colors to be actually printed by using the spot colors are different from the colors according to the designated RGB values. Accordingly, the display color items 404 on the spot color setting screen 402 may display the colors that are close to the colors to be actually printed (may display the colors according to the display RGB values) instead of displaying the colors according to the designated RGB values.

For example, in the case of printing the values R=255, G=0, and B=255 as fluorescent pink as shown in FIG. 5, the florescent pink color to be actually printed is displayed on the display unit 119 (see FIG. 1) by using the color close to the values R=255, G=130, and B=220. As a consequence, the color item 404 is displayed based on the values R=255, G=130, and B=220.

The present embodiment shows the example of printing each of the corresponding RGB values in a fluorescent spot color by using the fluorescent pink ink. Instead, spot colors using other special color inks such as silver and gold may be allocated to arbitrary RGB values. The printer driver 203 retains information on the designated RGB values, the display RGB values, and the corresponding commands which correspond to these spot colors.

Note that the setting concerning the spot color is not limited only to the above-described method. For example, the image output apparatus 102 first displays an item on the printer driver 203 for accepting the setting as to whether or not it is appropriate to activate the spot color printing. Then, the setting as to whether or not it is appropriate to activate the spot color printing of each color may be accepted on the screen shown in FIG. 4B in the case where the setting for executing the spot color printing is accepted as a consequence of an operation involving the relevant item.

Figure 6:
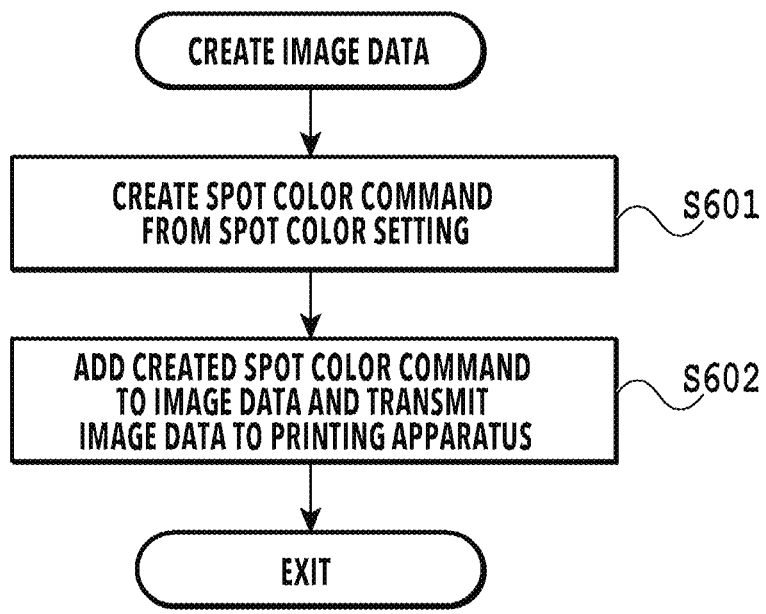
FIG. 6 is a flowchart showing print data creation processing.

FIG. 6 is a flowchart showing print data creation processing. In the case where the print button 311 of the poster data creation application 314 is pressed in a state of each of the control items on the print setting dialogue 400 (see FIG. 4A), the print setting is transmitted to the graphics processing unit 205 (see FIG. 2) through the OS printing system. The print data creation processing of the present embodiment will be described below with reference to the flowchart in FIG. 6. Note that the series of processing shown in FIG. 6 is carried out by causing the CPU 111 of the host computer 101 to load the program codes stored in the ROM 112 into the external storage device 114 and to execute the program codes. Alternatively, part or all of the functions of the steps in FIG. 6 may be realized by hardware such as an ASIC and an electronic circuit. Note that code "S" used in the explanation of each processing means the step in the corresponding flowchart.

In the case where the print data creation processing is started, the graphics processing unit 205 creates a command for printing the RGB values selected on the spot color setting screen 402 as the spot color by the control of the CPU 111 in S601. Thereafter, in S602, the graphics processing unit 205 adds the command designating the spot color to the print data obtained by converting the image to be printed into the format interpretable by the printing apparatus 102 by the control of the CPU 111, and transmits the print data to the printing apparatus 102. In other words, the CPU 111 transmits special color information to the printing apparatus 102. In this instance, the graphics processing unit 205 adds the command corresponding to the set spot color described in FIG. 5 instead of carrying out the processing for changing the RGB values designated as the spot color into other values by editing on the print data. Note that the information at least associating the designated RGB values with the commands as shown in FIG. 5 is also managed by the printing apparatus 102. The printing apparatus 102 can identify the designated RGB values targeted for the spot color based on the received command.

FIGS. 7A to 7C are diagrams showing the commands to be added. For example, a command shown in FIG. 7A is added in the case of designating the values R=255, G=0, and B=255 as the spot color, and a command shown in FIG. 7B is added in the case of designating the values R=255, G=170, and B=255 as the spot color. In the case of designating the values R=255, G=0, and B=255 as well as the values R=255, G=170, and B=255 as the spot colors, a logical sum of both of bit flags in FIG. 7A and FIG. 7B is designated as shown in FIG. 7C. In this way, it is possible to designate two or more spot colors with a single command.

As described above, in the present embodiment, the multiple spot colors that can be designated are displayed on the spot color setting screen. Accordingly, in the present embodiment, screens do not have to be switched in the case of designating the multiple spot colors, and it is easier to recognize which RGB values are set to the spot color. As a consequence, it is possible to realize an information processing apparatus, a control method, and a storage medium, which are capable of suppressing the occurrence of an unintended print result.

Second Embodiment

A second embodiment of the present invention will be described below with reference to the drawings. Note that the basic configuration of the present embodiment is the same as the configuration of the first embodiment. Accordingly, characteristic structures of the present embodiment will be described below.

Figure 8:
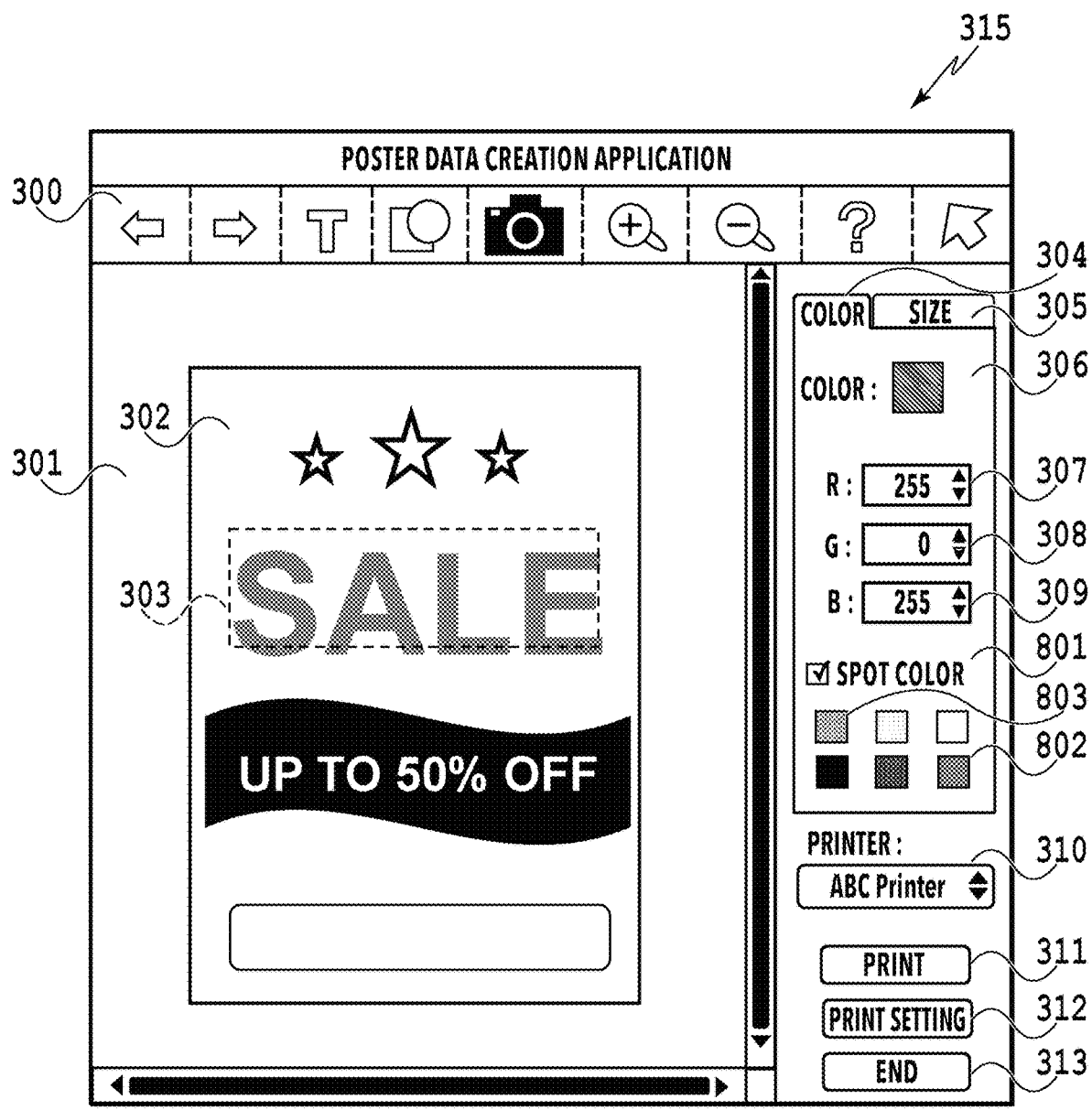
FIG. 8 is a diagram showing a poster data creation application.

FIG. 8 is a diagram showing a poster data creation application 315 of the present embodiment. The first embodiment has described the example of opening the print setting dialogue 400 from the poster data creation application 314 and designating the spot color by opening the spot color setting screen 402. The present embodiment will describe an example of a configuration to directly set the spot color on a screen of the poster data creation application 315 in order to improve user convenience. Note that portions not expressly stated in the following description are the same as those of the first embodiment.

The poster data creation application 315 of the present embodiment includes a check box 801 and a pallet 802 of the spot colors so as to enable selection and setting of the spot color on the poster data creation application 315.

Figure 9:
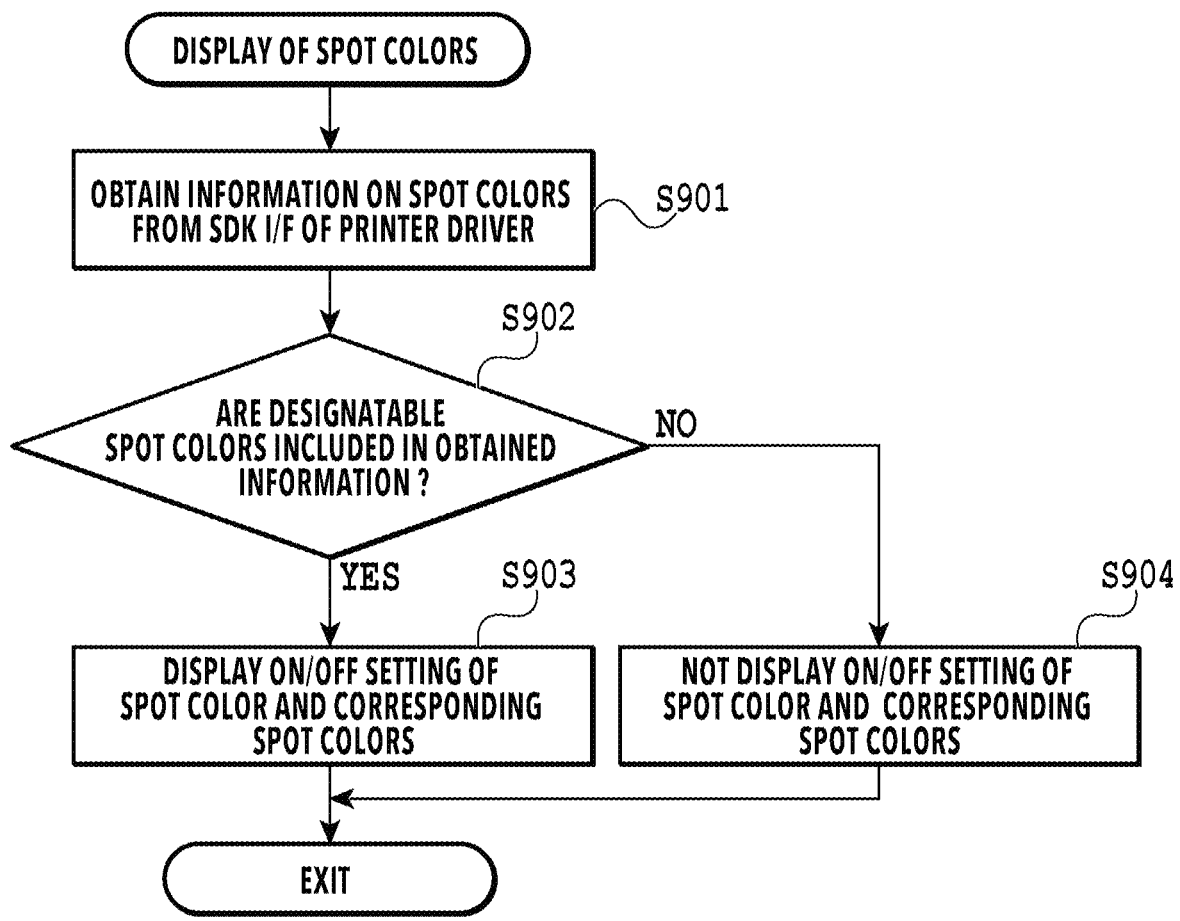
FIG. 9 is a flowchart showing spot color display processing.
Figure 10A:
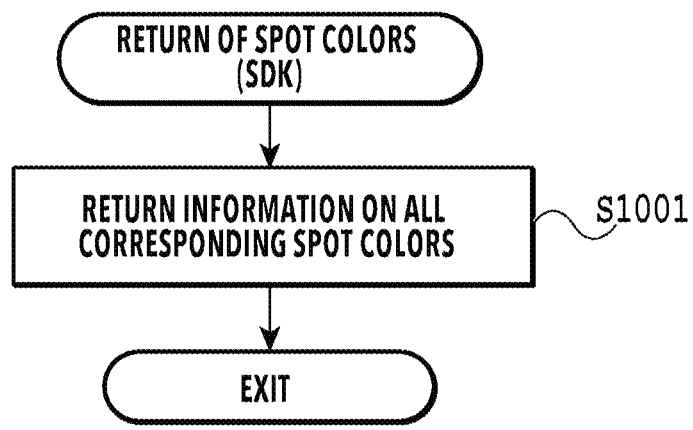
FIG. 10A is a flowchart showing spot color return processing.
Figure 10B:
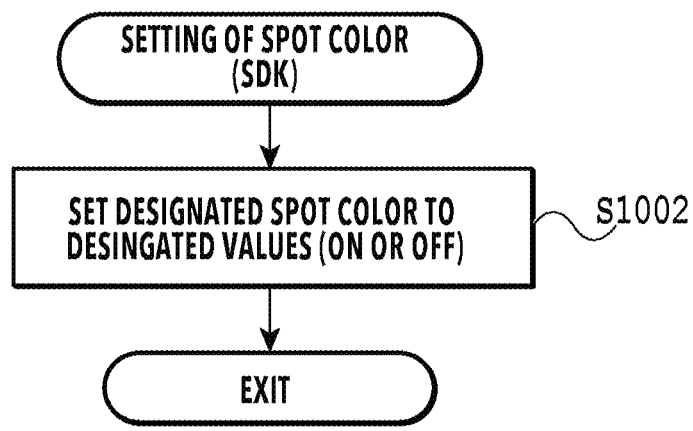
FIG. 10B is a flowchart showing setting processing.

FIG. 9 is a flowchart showing spot color display processing of the present embodiment. Meanwhile, FIG. 10A is a flowchart showing spot color return processing to be carried out in the course of the spot color display processing. The spot color display processing of the present embodiment will be described below with reference to the flowcharts in FIGS. 9 and 10A. Note that the series of processing shown in FIGS. 9, 10A, and 10B is carried out by causing the CPU 111 of the host computer 101 to load the program codes stored in the ROM 112 into the external storage device 114 and to execute the program codes. Alternatively, part or all of the functions of the steps in FIGS. 9, 10A, and 10B may be realized by the hardware such as the ASIC and the electronic circuit.

In the case where the spot color display processing of the present embodiment is started, the poster data creation application 315 accesses the SDK I/F 206 of the printer driver 203 for the printer selected by using the control item 310 by the control of the CPU 111 in S901. Then, the poster data creation application 315 (the application 202) obtains the information on the spot colors compatible with (supported by) the printer driver 203. In this instance, the printer driver 203 returns the information on all the compatible spot colors to the poster data creation application 315 (the application 202) as shown in FIG. 10B (S1001). Specifically, in response to a request from the poster data creation application 315 (the application 202) for obtaining the information on the spot colors, the printer driver 203 returns the information on the spot colors through the SDK I/F 206. Note that the information shown in FIG. 5 is returned as the information on the spot colors to be returned to the poster data creation application 315 by the printer driver 203.

Thereafter, based on the information on the printing apparatus 102 and the like obtained by the information obtaining unit 207, the poster data creation application 315 determines whether or not the spot colors that can be designated are included in the obtained information on the spot colors by the control of the CPU 111 in S902. In the case where there are the spot colors that can be designated, the processing goes to S903 to display the check box 801 to set on and off of the spot color and to display the pallet 802 of the settable spot colors, and then the processing is terminated. On the other hand, in the case where there are no colors that can be designated in the information obtained in S902, the processing goes to S904 to terminate the processing without displaying the check box 801 to set on and off of the spot color or displaying the pallet 802 of the settable spot colors.

Then, in the case where the user designates the spot color, the user selects an object that the user wishes to print in the spot color on the poster data creation application 315. In FIG. 8, an object in the selecting frame 303 is the selected object. Thereafter, the user turns on the check box 801 of the spot color and selects the spot color that the user wishes to use for the printing from the colors in the pallet 802. Here, if the user selects a color 803 having the values R=255, G=0, and B=255 from the pallet 802, the color of the selected object in the object selecting frame 303 is changed to the color having the values R=255, G=0, and B=255.

Then, the poster data creation application 315 accesses the SDK I/F 206 of the printer driver 203, and sets the color having the values R=255, G=0, and B=255 in the printer driver 203 as the spot color. In this instance, the printer driver 203 sets the color having the values R=255, G=0, and B=255 to an on-state as the spot color in S1002 as shown in FIG. 10B. Moreover, the printer driver 203 also sets a color 306 to the selected color having the values R=255, G=0, and B=255 and sets the R value 307 to 255, the G value 308 to 0, and the B value 309 to 255.

Thereafter, in the case where the user presses the print button 311 (see FIG. 8) and executes the printing, the print setting is transferred to the graphics processing unit 205 through the OS printing system. Then, the application 202 transmits the command corresponding to the spot color having the values R=255, G=0, and B=255 to the printing apparatus 102 together with the print data as with the first embodiment.

Here, the color to be expressed as the spot color on the screen in FIG. 8 may be expressed by using a color having different values from the designated RGB values based on the relation in FIG. 5. For example, the color 803 having the values R=255, G=0, and B=255 is displayed with the color having the values R=255, G=130, and B=220. Then, in the case where the color having the values R=255, G=0, and B=255 is selected as the spot color, the object 303 and the color 306 are also displayed with the color having the values R=255, G=130, and B=220. Nonetheless, the designated RGB values (R=255, G=0, and B=255) are displayed on the R value 307, the G value 308, and the B value 309.

Meanwhile, in the case of setting the spot color off in the spot color check box 801, the colors in the object 303 and the color 306 are displayed by using the designated RGB values instead of the display RGB values.

As described above, the multiple spot colors that can be designated are displayed on the data creation application. In this way, it is possible to realize an information processing apparatus, a control method, and a storage medium, which are capable of suppressing the occurrence of an unintended print result.

Third Embodiment

A third embodiment of the present invention will be described below with reference to the drawings. Note that the basic configuration of the present embodiment is the same as the configuration of the first embodiment. Accordingly, characteristic structures of the present embodiment will be described below.

In the first embodiment, the printer driver 203 includes the data shown in FIG. 5 in advance and the spot color setting screen 402 is displayed based on the data. In the present embodiment, the printer driver 203 obtains the information on the spot colors from the printing apparatus 102 by using the information obtaining unit 207, and displays the spot color setting screen corresponding to the obtained information. A method therefor will be described below.

Figure 11A:
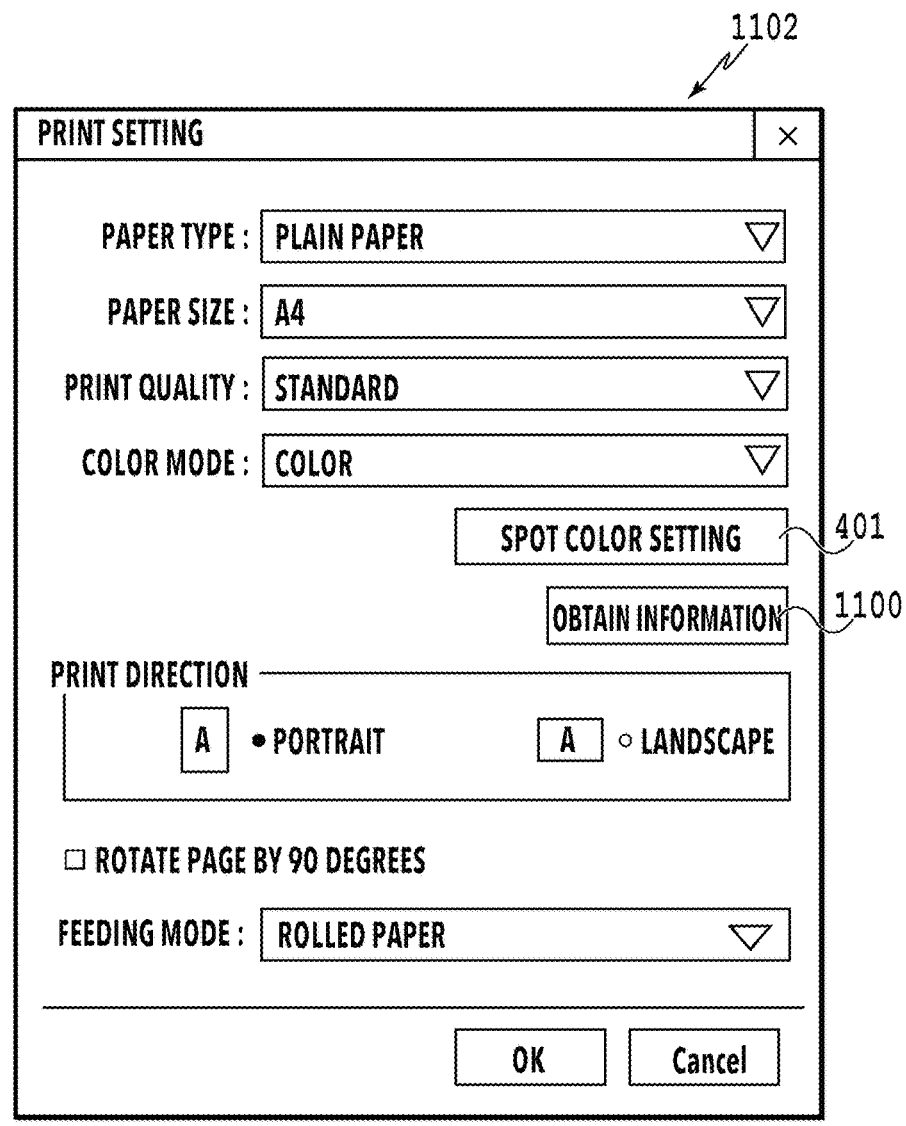
FIG. 11A is a diagram showing a print setting dialog.
Figure 11B:
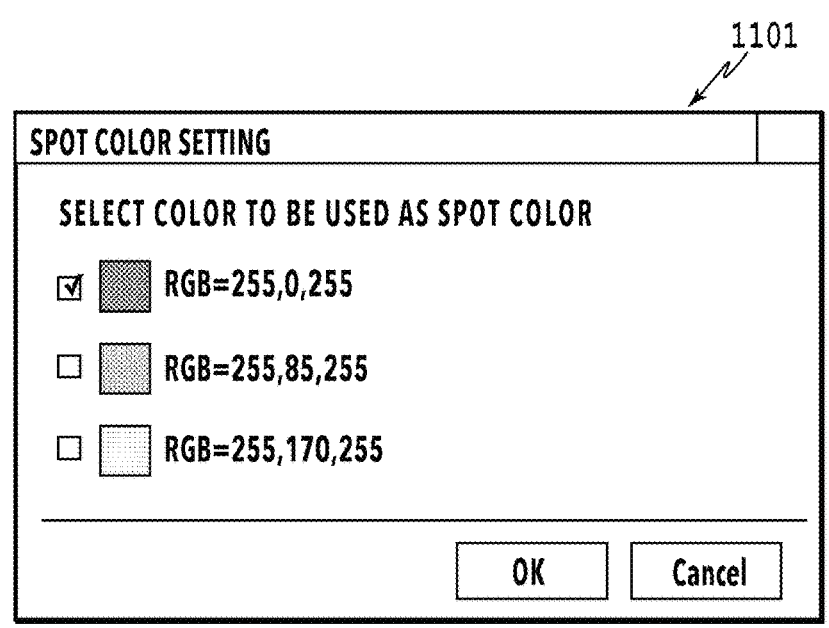
FIG. 11B is a diagram showing a spot color setting screen.
Figure 12:
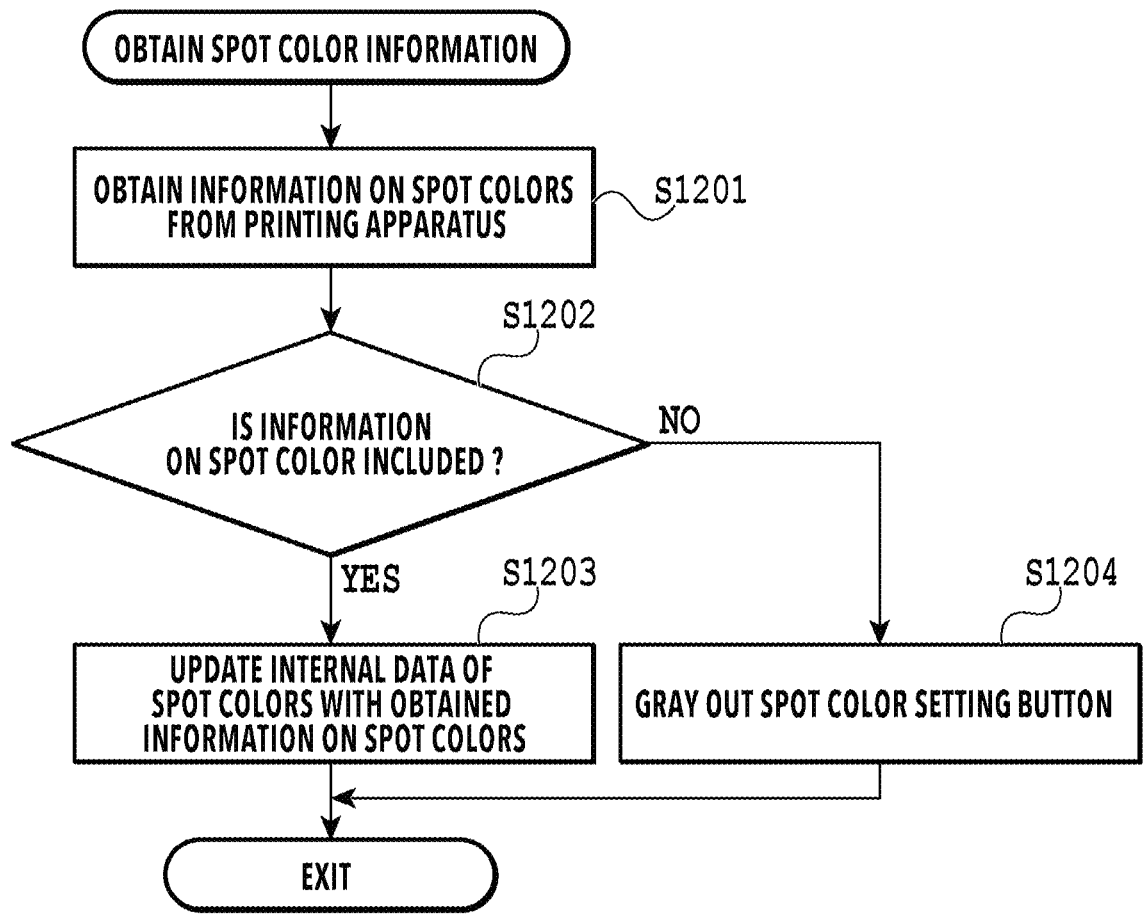
FIG. 12 is a flowchart showing spot color information update processing.

FIG. 11A is a diagram showing a print setting dialog 1102 which is a setting screen of the printer driver 203, and FIG. 11B is a diagram showing a spot color setting screen 1101 of the present embodiment. Meanwhile, FIG. 12 is a flowchart showing spot color information update processing, and FIG. 13 is a diagram showing designated RGB values, displayed RGB values, and corresponding commands, which correspond to the spot colors.

The print setting dialog 1102 includes an obtain information button 1100 for obtaining the information on the spot colors from the printing apparatus 102. Now, the spot color information update processing of the present embodiment will be described below with reference to the flowchart of FIG. 12. The series of processing shown in FIG. 12 is carried out by causing the CPU 111 of the host computer 101 to load the program codes stored in the ROM 112 into the external storage device 114 and to execute the program codes. Alternatively, part or all of the functions of the steps in FIG. 12 may be realized by the hardware such as the ASIC and the electronic circuit.

The spot color information update processing is started in the case where the obtain information button 1100 is pressed by the user. In S1201, the information obtaining unit 207 of the printer driver 203 obtains the information on the spot colors as shown in FIG. 13 from the printing apparatus 102 by the control of the CPU 111. Thereafter, the information obtaining unit 207 determines whether or not the information on the spot colors is included in the obtained information by the control of the CPU 111 in S1202. In the case where the information on the spot colors is included, the processing goes to S1203 to rewrite internal data with the obtained data (such as the data shown in FIG. 13) and then the processing is terminated. If the information on the spot color is not included in the obtained information in S1202, the processing goes to S1204 to gray out the spot color setting the spot color setting button 401 to represent the printing apparatus 102 not compatible with the spot colors. Thus, the spot color setting is disabled and then the processing is terminated.

In the case of rewriting the internal data by the control of the CPU 111 in S1203, the printer driver 203 displays a new spot color setting screen 1101 based on the rewritten data (such as the data shown in FIG. 13) in the case where the button 401 is pressed.

Meanwhile, after updating the internal data with the information on the spot colors obtained from the printing apparatus 102, the printer driver 203 also updates the values of the spot colors returned to the application 202 by the SDK I/F 206 with the data shown in FIG. 13. Accordingly, the display of the spot colors that the application 202 displays by using the SDK I/F 206 can also be changed to the spot colors obtained from the printing apparatus 102.

Here, the multiple spot colors available for the printing with the printing apparatus 102 have degrees of clearness that are different from one another. Accordingly, priorities defined in such a way as to rank a clearer spot color that commands attraction higher may be added to the information obtained from the printing apparatus 102 and to the information returned from the SDK I/F 206 to the application. Then, a spot color setting screen 901 of the printer driver 203 and the order to line up options of the spot colors of the application 202 may be changed based on the priorities.

As described above, the spot color setting screen is displayed by obtaining the information on the spot colors from the printing apparatus by using the information obtaining unit of the printer driver. Thus, it is possible to realize an information processing apparatus, a control method, and a storage medium, which are capable of suppressing the occurrence of an unintended print result. Moreover, by obtaining the information on the spot colors from the printing apparatus, it is possible to perform the printing in the spot color appropriately even in a case where the printing apparatus carries new spot colors. On the other hand, even in a case where the printing apparatus is no longer compatible with the spot color printing, it is possible to suppress the occurrence of an unintended print result by allowing the user to disable the spot color setting.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-019318 filed Feb. 9, 2021, which is hereby incorporated by reference wherein in its entirety.

What is claimed is:

1. A non-transitory computer readable storage medium storing a prescribed program, the prescribed program causing a computer to execute:
   executing processing to display,
   a first display region to execute printing by using a first color adopting an ordinary color ink being an ink of a process color and a specific color ink being an ink of a color other than the process color, and
   a second display region being different from the first display region to execute printing by using a second color being different from the first color and adopting at least the specific color ink; and
   executing
   processing to change from setting to print a first print region in a print target image corresponding to first RGB values by using a third color being the process color to setting to print the first print region by using the first color in a case where the first display region is operated, and
   processing to change from setting to print a second print region in the print target image corresponding to second RGB values by using a fourth color being the process color to setting to print the second print region by using the second color in a case where the second display region is operated, wherein
   the first display region displays an object of a fifth color that is a color corresponding to the first color and is different from the first color and the third color, and
   the second display region displays an object of a sixth color that is a color corresponding to the second color and is different from the second color and the fourth color.

2. The non-transitory computer readable storage medium according to claim 1, wherein
   the first display region displays values representing the first RGB values, and
   the second display region displays values representing the second RGB values.

3. The non-transitory computer readable storage medium according to claim 1, wherein the prescribed program further causes the computer to execute:
   obtaining capability information on an printing apparatus, wherein
   the computer performs control in such a way as not to display a region out of the first display region and the second display region to be subjected to execution of printing by using a color not compatible with the capability information on the printing apparatus.

4. The non-transitory computer readable storage medium according to claim 1, wherein the processing to display the first display region and the second display region is processing to display the first display region and the second display region on a screen displayed by the prescribed program.

5. The non-transitory computer readable storage medium according to claim 1, wherein
   the processing to display the first display region and the second display region is processing to cause a different program being different from the prescribed program to obtain information for displaying the first display region and the second display region, and
   in a case where the different program obtains the information for displaying the first display region and the second display region, the first display region and the second display region are displayed on a screen displayed by the different program.

6. The non-transitory computer readable storage medium according to claim 5, wherein
   the prescribed program is a printer driver, and
   the different program is a program configured to input RGB values concerning the print target image.

7. The non-transitory computer readable storage medium according to claim 1, wherein the prescribed program further causes the computer to execute:
   transmitting print data for printing the print target image and a command for printing the first print region by using the first color to a printing apparatus in a case where printing of the print target image is instructed after execution of the processing to change to the setting to print the first print region by using the first color.

8. The non-transitory computer readable storage medium according to claim 1, wherein
   processing to display a third display region, the third display region being different from the first display region and from the second display region, to execute printing by using a seventh color being different from the first color and the second color and adopting at least the specific color ink is further executed, and
   processing to change from setting to print a third print region in the print target image corresponding to third RGB values by using an eighth color being the process color to setting to print the third print region by using the seventh color is further executed in a case where the third display region is operated.

9. The non-transitory computer readable storage medium according to claim 1, wherein the specific color ink includes an ink of a fluorescent color.

10. The non-transitory computer readable storage medium according to claim 1, wherein the specific color ink includes at least one of a violet ink, a green ink, and an orange ink.

11. The non-transitory computer readable storage medium according to claim 1, wherein the prescribed program is a printer driver.

12. The non-transitory computer readable storage medium according to claim 1, wherein the prescribed program is a program configured to input RGB values concerning the print target image.

13. The non-transitory computer readable storage medium according to claim 1, wherein the prescribed program is a poster data creation application program.

14. The non-transitory computer readable storage medium according to claim 1, where in a plurality of display regions including the first display region and the second display region are controlled in such a way as to be arranged and displayed in an order in accordance with prescribed priorities.

15. The non-transitory computer readable storage medium according to claim 14, wherein the prescribed priorities are defined in such a way as to rank a display region corresponding to degrees of clearness based on defined priorities.

16. The non-transitory computer readable storage medium according to claim 1, wherein
the fifth color is displayed by RGB values being different from RGB values to display the third color, and
the sixth color is displayed by RGB values being different from RGB values to display the fourth color.

17. A control method of an information processing apparatus comprising:
executing processing to display
a first display region to execute printing by using a first color adopting an ordinary color ink being an ink of a process color and a specific color ink being an ink of a color other than the process color, and
a second display region being different from the first display region to execute printing by using a second color being different from the first color and adopting at least the specific color ink; and
executing
processing to change from setting to print a first print region in a print target image corresponding to first RGB values by using a third color being the process color to setting to print the first print region by using the first color in a case where the first display region is operated, and
processing to change from setting to print a second print region in the print target image corresponding to second RGB values by using a fourth color being the process color to setting to print the second print region by using the second color in a case where the second display region is operated, wherein
the first display region displays an object of a fifth color that is a color corresponding to the first color and is different from the first color and the third color, and
the second display region displays an object of a sixth color that is a color corresponding to the second color and is different from the second color and the fourth color.

18. An information processing apparatus comprising:
a display controller configured to execute processing to display
a first display region to execute printing by using a first color adopting an ordinary color ink being an ink of a process color and a specific color ink being an ink of a color other than the process color, and
a second display region being different from the first display region to execute printing by using a second color being different from the first color and adopting at least the specific color ink; and
a change controller configured to execute
processing to change from setting to print a first print region in a print target image corresponding to first RGB values by using a third color being the process color to setting to print the first print region by using the first color in a case where the first display region is operated, and
processing to change from setting to print a second print region in the print target image corresponding to second RGB values by using a fourth color being the process color to setting to print the second print region by using the second color in a case where the second display region is operated, wherein
the first display region displays an object of a fifth color that is a color corresponding to the first color and is different from the first color and the third color, and
the second display region displays an object of a sixth color that is a color corresponding to the second color and is different from the second color and the fourth color.

\* \* \* \* \*